July 22, 1958   A. E. BOREL ET AL   2,844,637
GASTIGHT INSTRUMENT SHELL FOR FURNACES
Filed Aug. 31, 1953
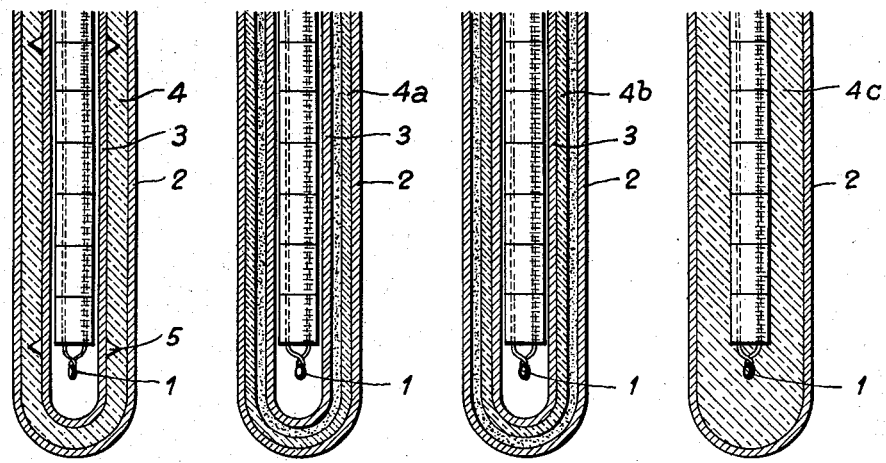
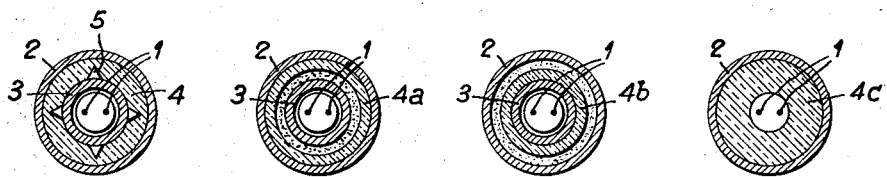
INVENTORS:
ALFRED EDOUARD BOREL
JEAN-PIERRE BOREL
By Raymond Wooton
ATTORNEY

United States Patent Office 2,844,637
Patented July 22, 1958

2,844,637

GASTIGHT INSTRUMENT SHELL FOR FURNACES

Alfred Edouard Borel, Neuchatel, and Jean-Pierre Borel, Vevey, Switzerland

Application August 31, 1953, Serial No. 377,646

Claims priority, application Switzerland September 5, 1952

4 Claims. (Cl. 136—4)

Our present invention relates to a shell destined to make gastight a defined space in a furnace.

In order to measure, for example, the temperature in industrial furnaces, thermo-electric elements commonly are used which usually are protected by an exterior tube made of metal or ceramic material. If, however, the furnace atmosphere comprises, for example, sulfurous gases or carbonic oxide, or if the thermo-electric element and its protector tube are immersed, for example, in saline cementation or hardening baths, the gases pass through the protector tube either by reason of its porosity or by deep cementation or, again, by chemical proximity transmission and generally attack the thermo-electric element and modify its indications. The same disturbing effects arise when an optical temperature-measuring instrument is used in place of the thermo-electric element.

The main object of our present invention is to provide a gastight shell or cover. We have found that certain thermoplastic bodies, such as glasses and enamels are gastight.

The shell forming the subject matter of our present invention is characterized in that it comprises a coat of thermoplastic gastight material.

Four examples of our invention are shown in the accompanying drawing, in which—

Figs. 1, 3, 5 and 7 are longitudinal sections of which each shows schematically one example, and Figs. 2, 4, 6 and 8 are cross-sections corresponding to the Figs. 1, 3, 5 and 7 respectively.

The examples have been limited to the case where the shell which forms the subject matter of our present invention, is destined to protect a thermo-electric element 1. Such shell, however, obviously also may serve to protect an optical temperature-measuring instrument or to permit to thermally treat an object in a controllable atmosphere independent of the operating temperature.

In the first form of the invention (Figs. 1 and 2), the protector shell of the thermo-electric element 1 comprises an outer tube 2, an inner tube 3 of the same material as the outer tube, and a coat 4 of gastight thermoplastic material which fills the entire space between the two tubes 2 and 3. The tube 2 comes in contact with the furnace atmosphere or with the bath and normally is made of metal. If, however, this tube is intended for contact with a sulfurous flame or an atmosphere which attacks metal, or if the tube is immersed in a bath which is in contact with a source of electric energy of elevated voltage, it is made of ceramic material.

The thermoplastic material 4 is chosen to satisfy the following four requirements:

(1) Its coefficient of thermal expansion shall be substantially the same as that of the tube material;

(2) it shall soften at the operating temperatures of the shell so as to be able to better follow the expansions of the two tubes;

(3) its temperature of devitrification shall be exceeded under normal operating conditions so as to preserve its vitrous character;

(4) its adherence to said tubes shall be positive.

The two following examples give the chemical composition of a particularly suitable thermoplastic material, the first being suitable for use with tubes of chrome-plated steel, and the second for use with tubes of ceramic material.

*Example I*

| | Percent |
|---|---|
| $SiO_2$ | 68 |
| $Al_2O_3$ | 4 |
| $Fe_2O_3$ | 0.7 |
| $CaO$ | 6 |
| $MgO$ | 0.5 |
| $Na_2O$ | 13 |
| $K_2O$ | 7.3 |
| $B_2O_3$ | 0.5 |

The glass obtained by such composition, of which the constituents may vary up to 15%, possesses a high coefficient of thermal expansion, and the shell obtained in this way is particularly suitable for measuring elevated temperatures in the range of 800–1200° C.

*Example II*

| | Percent |
|---|---|
| $SiO_2$ | 80 |
| $Na_2O$ | 4 |
| $K_2O$ | 1 |
| $Al_2O_3$ | 2 |
| $Fe_2O_3$ | 0.4 |
| $CaO$ | 0.5 |
| $MgO$ | 0.1 |
| $B_2O_3$ | 12 |

This composition is that of a glass of the type "Pyrex" and has a low coefficient of thermal expansion. If the measuring instrument mentioned above is to be used for relatively low temperatures, i. e. below 800° C., preferably an enamel is chosen as thermoplastic material which has the usual composition.

In the first example of shell mentioned above in connection with Figs. 1 and 2, recesses 5 are provided on the interior tube 3 in order to maintain the latter coaxial with tube 2, since the material of coat 4 is softened under normal operating conditions and the inner tube thus is free to move laterally.

The second example of shell, shown in Figs. 3 and 4, only differs from the first in that the coat 4a of thermoplastic material does not entirely fill the space between the two tubes 2 and 3, but merely covers the interior wall of outer tube 2.

In order to ensure the transmission of the heat through the space between coat 4a and inner tube 3, such space may be filled by a body in powder form or by a body which is liquid at the operating temperatures of said instrument, in order that the coefficient of expansion of the filler material does not create any complications. A metal well suited for such filler is tin. Molten tin does not adhere to glass, and although such tin coat is in fusion and the coat of thermoplastic material is softened, the latter adheres sufficiently strong to the wall of tube 2, through capillarity and affinity with the ferrous oxides, to avoid the formation of convection streams between said material and the molten tin in the space between the two tubes 2 and 3. Such disposition gives a satisfactory thickness of the coats of thermoplastic material and filler, such thickness being substantially the same for both materials and of the order of from one to two millimeters.

The third example (Figs. 5 and 6) only differs from the second example in that the coat 4b of thermoplastic material covers the outside of inner tube 3. The space between coat 4b and tube 2 may be left void or filled by a body in the form of powder or a metal which is liquid at the operating temperatures of said instrument.

In the fourth example (Figs. 7 and 8) the protector shell comprises only an outer tube 2, and the thermoelectric element 1 is surrounded by thermoplastic material 4c which fills the entire space outside of said element 1 in tube 2.

In the four examples of the subject matter of our present invention described above, the gases or cementing products may transform the structure of the material of outer tube 2, but the coat of thermoplastic material present in the latter prevents the gases from entering into the space containing the thermo-electric element. Thus the desired atmosphere may be maintained in said space.

Obviously, the shell may have another form than the one shown, although the cylindrical form is that which lends itself best to the manufacture of the different parts of the shell.

What we claim as new and desire to secure by Letters Patent is:

1. A thermocouple adapted for use within a furnace at temperatures in the range of 800° to 1200° C. comprising a pair of similar nested gas pervious metal tubes having spaced proximate walls and being closed at one end, an adherent layer of glass impermeable to gases interposed between said walls and having a coefficient of thermal expansion substantially equal to that of each of said tubes, said material softening within said temperature range and each of said tubes having a softening temperature above 1200° C., and a thermoelectric responsive element disposed within said tubes.

2. A thermocouple as set forth in claim 1 wherein at least one of said tubes is composed of chrome plated steel.

3. A thermocouple as set forth in claim 1 wherein said glass has approximately the following composition: 68% $SiO_2$, 4% $Al_2O_3$, 0.7% $Fe_2O_3$, 6% CaO, 0.5% MgO, 13% $Na_2O$, 7.3% $K_2O$, and 0.5% $B_2O_3$.

4. A thermocouple as set forth in claim 1 wherein said glass has approximately the following composition: 80% $SiO_2$, 4% $Na_2O$, 1% $K_2O$, 2% $Al_2O_3$, 0.5% CaO, 0.1% MgO, and 12% $B_2O_3$.

References Cited in the file of this patent

UNITED STATES PATENTS

| | | |
|---|---|---|
| 578,333 | Hilgeman | Mar. 9, 1897 |
| 1,489,116 | Chevenard | Apr. 1, 1924 |
| 1,615,451 | Harrison | Jan. 25, 1927 |
| 1,773,826 | Simms | Aug. 26, 1930 |
| 1,994,983 | Florez et al. | Mar. 19, 1935 |
| 2,027,961 | Currie | Jan. 14, 1936 |
| 2,177,046 | Sweo | Oct. 24, 1939 |
| 2,405,075 | Vollrath | July 30, 1946 |
| 2,664,373 | Reilly | Dec. 29, 1953 |

FOREIGN PATENTS

| | | |
|---|---|---|
| 7,910 of 1908 | Great Britain | June 2, 1908 |
| 330,726 | Germany | Dec. 21, 1920 |

OTHER REFERENCES

Lange, N. A.: "Handbook of Chemistry," Handbook Publishers, Inc., Sandusky, Ohio, Ed. 7, 1949, page 179.

Norton, F. H.: "Elements of Ceramics," Addition-Wesley Press, Inc., Cambridge, Massachusetts, 1952, page 156.